United States Patent [19]

Canup

[11] 4,416,246
[45] Nov. 22, 1983

[54] INTERNAL COMBUSTION ENGINE WITH FUEL INJECTION AND AC TYPE HIGH TENSION SPARK

[75] Inventor: Robert E. Canup, Poughkeepsie, N.Y.

[73] Assignee: Texaco Inc., White Plains, N.Y.

[21] Appl. No.: 373,322

[22] Filed: Apr. 30, 1982

[51] Int. Cl.³ .............................................. F02P 9/00
[52] U.S. Cl. ................................... 123/618; 123/606; 123/617; 123/146.5 A; 123/179 BG
[58] Field of Search ............... 123/606, 612, 617, 618, 123/625, 626, 645, 305, 146.5 A, 179 BG

[56] References Cited

U.S. PATENT DOCUMENTS

| | | | |
|---|---|---|---|
| 3,757,754 | 9/1973 | Wiegand | 123/617 |
| 3,913,550 | 10/1975 | Canup | 123/606 |
| 4,111,178 | 9/1978 | Casey | 123/305 |
| 4,341,196 | 7/1982 | Canup et al. | 123/612 |
| 4,342,305 | 8/1982 | Canup et al. | 123/617 |

FOREIGN PATENT DOCUMENTS 2051230  1/1981  United Kingdom ................ 123/606

Primary Examiner—Charles J. Myhre
Assistant Examiner—Andrew M. Dolinar
Attorney, Agent, or Firm—Carl G. Ries; Robert A. Kulason; Henry C. Dearborn

[57] ABSTRACT

An improvement for a combination with a fuel injection type internal combustion engine which employs AC type high tension spark that is initiated by the injection valve opening. The improvement includes a gating circuit, and it has means for opening the gate at the beginning of a predetermined crank shaft position. Also, it closes the gate whenever the injection valve has opened, or at the end of a predetermined number of degrees of crank shaft rotation whichever occurs first.

8 Claims, 1 Drawing Figure

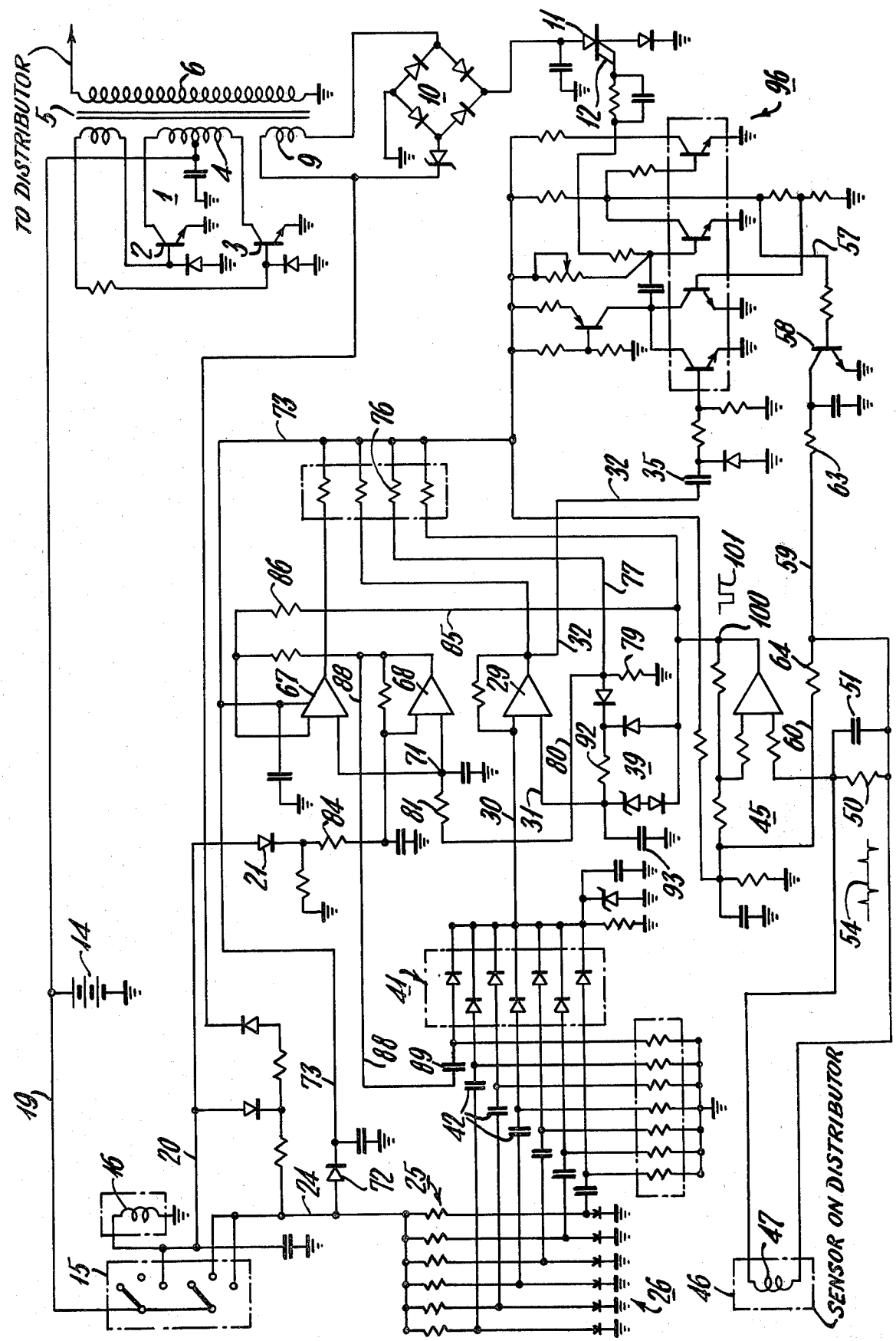

INTERNAL COMBUSTION ENGINE WITH FUEL INJECTION AND AC TYPE HIGH TENSION SPARK

BACKGROUND OF THE INVENTION

1. Field of the Invention

This invention concerns an ignition system that is applicable to a fuel injection type internal combustion engine.

2. Description of the Prior Art

Internal combustion engines which make use of fuel injection have been developed in combination with ignition systems in order to take advantage of the opening of the injector valves so as to trigger an ignition spark. Such spark assists in the combustion of the fuel. However, it has been found difficult to avoid spurious signals that are created when the injector valve opens since it is not a clean electrical circuit break or switch opening which is created.

One prior approach to the difficulty has been described in a copending application assigned to the same assignee as this application, i.e. Ser. No. 200,753 filed Oct. 27, 1980, now U.S. Pat. No. 4,342,305, which is a continuation of Ser. No. 048,867 filed June 15, 1979. It involved a lockout circuit arrangement which would stop any additional signals created by the injection valve after the initial opening for a predetermined period of time. However, it was found that the injection of fuel takes place over a fixed number of crank shaft degrees of rotation and consequently, at low engine speeds a fixed time delay represented only a few crank shaft degrees while at high speeds it included many crank shaft degrees of rotation. Consequently, the fastest engine speed was determined by the fixed time the system was locked out, and this is an undesirable feature.

In another approach to the problem, some of the principles indicated in circuits disclosed by a U.S. Pat. No. 3,926,165 were employed in order to have a lockout circuit which would lockout the spark signal for a fixed number of crank shaft degrees. However, in that arrangement a difficulty was found in the case where the lockout happened to exceed the maximum permissable lockout. For example, in a four cylinder engine the maximum lockout is ninety degrees, in a six cylinder it is sixty degrees and in an eight cylinder engine, it is forty-five degrees. And, if the injection should not take place on one cycle (such as under deceleration conditions) the lockout circuit would react as if the engine had only one half the number of cylinders so that the circuit would lockout every other firing pulse. The engine would then run on only one half the number of cylinders.

Furthermore, it has been found in practice that needle bounce by the injector valve sometimes continues (at full throttle) until just a few degrees before the next cylinder injects. Consequently, it is an object of this invention to provide an improved lockout circuit for use in the generation of spark signals created at the injection of fuel upon opening of an injector valve.

SUMMARY OF THE INVENTION

Briefly, the invention concerns an improvement that is in combination with an internal combustion engine having a crank shaft and employing fuel injection and including an AC type high tension electric spark to ignite a combustible mixture of said injected fuel. The combination also has a fuel injection valve having an electrically conductive material plunger in seating contact with an electrically conductive material body of said valve when closed. The said plunger is actuated by fuel pressure to open said valve. The combination also has first electrical circuit means for connecting a resistor in series with said plunger, and a comparator having two inputs and an output. The combination also has second circuit means for connecting a predetermined EMF to one of said comparator inputs, and third circuit means for connecting the other of said comparator inputs to said plunger. The said comparator output provides a signal to initiate said electric spark when said plunger is actuated by the fuel pressure. In that combination, the improvement comprises means for gating said comparator to permit said electric spark initiating signal only during a predetermined number of degrees of said crank shaft rotation.

Once more briefly, the invention is in combination with an internal combustion engine which has a crank shaft and fuel injection and includes an AC type high tension electric spark to ignite a combustible mixture of said injected fuel. Also it is in combination with a fuel injection valve having an electrically conductive material plunger in seating contact with an electrically conductive material body of said valve when closed, the said plunger is actuated by fuel pressure to open said valve. It also is in combination with a first electric circuit means for connecting a resistor in series with said plunger, and a comparator having two inputs and an output. Also, it is in combination with second circuit means for connecting a predetermined EMF to one of said comparator inputs, and third circuit means for connecting the other of said comparator inputs to said plunger. The said comparator output provides a signal to initiate said electric spark when said plunger is actuated by the fuel pressure. The improvement comprises means for gating said comparator to permit said electric spark initiating signal only during a predetermined number of degrees of said crank shaft rotation. The said gating means comprises a bi-stable circuit means, and a Wiegand sensor for switching said bi-stable circuit means. It also comprises means for actuating said Wiegand sensor at predetermined crank shaft positions to switch said bi-stable circuit means from one state to the other at the beginning and back at the end of said predetermined degrees of crank shaft rotation, and fourth circuit means for connecting said comparator output signal back to said gating means for switching said bi-stable means back whenever a spark initiating signal occurs. It also comprises fifth circuit means including an OR circuit for developing a comparator output signal upon switching said bystable means back at the end of said predetermined degrees of crank shaft rotation during cranking if said plunger has not been actuated to open said valve.

BRIEF DESCRIPTION OF THE DRAWING

The foregoing and other objects and benefits of the invention will be more fully set forth below in connection with the best mode contemplated by the inventor of carrying out the invention, and in connection with which there are illustrations provided in the drawing, wherein:

The FIGURE of drawings is a schematic circuit diagram illustrating a system according to the invention.

DESCRIPTION OF THE PREFERRED EMBODIMENT

The type of ignition system to which this invention applies, is one that is employed in connection with an internal combustion engine which has fuel injection that is accomplished by applying the fuel under pressure to open a plunger in an injection valve. And, the electrical spark signal that is employed for ensuring the combustion of the fuel mixture, is triggered by an electrical circuit including the valve so that when it lifts from its seat an electrical signal acts to trigger the spark for that cylinder. Such an arrangement has been suggested previously as for example in a copending application Ser. No. 200,753 filed Oct. 27, 1980, now U.S. Pat. No. 4,342,305, which is assigned to the same assignee as this application. However, that arrangement had drawbacks and limitations such as described above and consequently, this invention provides for overcoming those difficulties.

While a more conventional type of high tension electric spark signal might be employed with a system according to this invention, a preferred system is one like that illustrated in the drawing. It makes use of a continuous AC type of high tension electric spark that is commenced at the beginning of a spark interval and continues for a controlled length of time during which it produces a relatively high frequency AC spark signal. Thus, with reference to the drawing figure, the spark signal is generated by a continuous square wave oscillator 1 that includes a pair of transistors 2 and 3 that are connected to the ends of a center tapped primary winding 4 on a transformer 5 which has a secondary output winding 6 that feeds the AC spark signals to a distributor on the engine, as is indicated by the caption. The oscillator 1 is started and stopped by a control winding 9 that has an AC short circuit connected so as to load the oscillator and keep it from oscillating during the non-spark signal generating time. And, there is a DC bias current which is cut off at the beginning of the AC spark signal output so as to start the oscillator instantaneously. The AC short circuit and the DC bias current flow are controlled via a diode bridge 10 and a controlled rectifier 11 which has the spark control signals applied to a control element 12 for cutting off the current flow through rectifier 11 at the start of each of the spark signals. It then stops the oscillation at the end of each spark signal by recompleting the AC short circuit path. The operation of this type continuous AC ignition signal generating circuit is known and has been fully described in detail in one or more prior patents that are assigned to to the same assignee as this application, e.g. U.S. Pat. No. 3,818,885 issued June 25, 1974, and no further detailed description is deemed necessary.

The oscillator for generating the spark signal is supplied from a battery 14 and there is also a conventional ignition switch 15 which has a double pole switch with pair of arms for connecting a starter solenoid 16 when in the second position of the switch. The switch is spring biased back to the first position in a conventional manner so that after starting the running condition of the ignition system will be connected. It will be understood that when the ignition switch 15 is in the second (lower most contacts) position, the solenoid 16 will be energized along with the rest of the ignition system. This is conventionally known as the cranking mode, since the starter motor will be effective to crank the engine while the ignition switch is in that position. Also, at that time the battery voltage which is carried on a circuit connection 19 will be applied via the circuits clearly illustrated that lead to a full battery voltage circuit connection 20 that goes to part of the ignition system circuits via a diode 21. The purpose of this separate voltage source will be explained in greater detail below.

When the ignition switch 15 is in either of the cranking or run positions, the battery voltage from circuit connection 19 is supplied to a circuit connection 24 that leads to a parallel group of resistors 25, each of which is connected in series with one of a plurality of injector valves 26 that have the body of each grounded. These valves have an electrically conductive material plunger that is in seating contact with the electrically conductive material body of the valve, which is grounded so that when the valve is closed there is a solid grounded circuit from one end of each of the group of resistors 25. And the other end of each is connected to the battery voltage when the ignition switch 15 is in the start or run position. In operation, the plungers of these valves are actuated by fuel pressure to open each valve, and there is an electrical circuit which connects each of the resistors 25 in series with the corresponding plunger of one of the valves 26.

In order to develop an ignition control signal, there is a comparator 29 that has two inputs 30 and 31, and an output 32. Output 32 takes the ignition control signal via a capacitor 35 through a network to the control element 12 of the rectifier 11 for actuating the beginning of a spark signal interval.

Input circuit connection 31 of the comparator 29 is connected to a network 39 which applies a predetermined EMF to that input connection. The other comparator input connection 30 goes via one of a group of diodes 41 and a corresponding capacitor 42 to each of the plungers of the valves 26.

In order to accomplish the gating of the comparator 29 so as to limit the time during which signals from any one of the injector valve openings can be effective, there is a bi-stable circuit means or network 45 which is connected so as to be switched from one state to the other at the beginning of the gate open time, and back at the end. The switching for this purpose is accomplished by a Wiegand sensor unit 46 which has a coil 47 the output of which is connected across a resistor 50 with a capacitor 51 in parallel therewith. The pulse signals developed by the coil 47 are illustrated by a pulse symbol 54. It will be observed that a first pulse (in the positive direction) is the one that will switch the bi-stable circuit 45 from one state which holds the gate closed, to the other state which opens the gate. Thereafter, the next pulse which is in the negative direction, will switch the bi-stable circuit 45 back so as to close the gate once more.

As indicated above, the foregoing action takes place in dependence upon the crank shaft position of the engine, as it is rotating. It is to be noted that with a Wiegand sensor, the velocity does not effect the amplitude of the pulses. Rather, it is the physical position of the crank shaft in relation to the sensor elements. The sensor elements are arranged so that the pulses which open and close the gate are developed in accordance with a predetermined number of degrees of crank shaft rotation, beginning at a particular position which is related to each of the injector valve timings.

It may be noted that when there is a fuel injector valve opening, so that one plunger is raised, the signal created is fed via one of the capacitors 42 and a corresponding diode 41 to the input circuit 30 of the comparator 29. Then an ignition spark signal is created over the output circuit 32 and via the capacitor 35 to initiate an ignition spark signal. When that happens, instead of the gate circuit 45 waiting to be switched back by the following negative pulse from the Wiegand sensor, there is a feedback of the ignition spark signal pulse via a circuit connection 57 and a transistor 58 to circuit connections 59 and 60 plus resistors 63 and 64. This feedback switches the bi-stable circuit 45 back before the following or closing pulse from the sensor 47.

It will be appreciated that by having the sensor elements located on the distributor, the actual physical position of the sensor element which rotates will provide for developing the opening and closing gate pulses at the predetermined crank shaft angle positions, as indicated above. It will also be appreciated that whenever the feedback signal (as explained above) goes back and switches the bi-stable circuit 45 prior to the second, or gate closing pulse of the sensor 46 (i.e. from winding 47), the bi-stable circuit 45 will remain switched back so that the gate remains closed until the next gate opening pulse which acts for the next fuel injection.

An additional feature of this invention is that which provides for the development of an ignition spark signal during cranking, even if a fuel injector valve was not opened as the crank shaft was rotated (at cranking speed). This is accomplished by having an OR circuit that includes a pair of comparators 67 and 68. These are both connected with a fixed bias connected to one of the inputs of each. That bias voltage is developed at a point 71 in the circuit. This point 71 has a predetermined voltage connected to it which is determined by the potentiometer connections taken from the battery voltage beginning at the circuit connection 24 and going via a diode 72 over a circuit connection 73 to one end of a resistor 76. Then it goes via a connection 77 to a resistor 79 which has the other end thereof grounded. The point 71 is connected to the circuit connection 77 via a resistor 81 and a circuit connection 80.

The comparator 68 is in a conducting state when the system is in its run condition, i.e. switch 15 at the middle contacts. And consequently, the output of the OR circuit arrangement (comparitors 67 and 68) remains low irrespective of what happens at comparator 67. During cranking however, when the switch 15 is at the lowermost contacts position, the comparator 68 has a higher voltage applied to its other input via the circuit connection 20 and diode 21 plus a resistor 84, so that this comparator 68 will be nonconducting and its output will be at a high voltage. Then, during cranking when the gate circuit 45 closes, it applies a high voltage via a circuit connection 85 and a resistor 86 to the other input of comparator 67 so that its output goes high while the output of comparator 68 remains high. Therefore, the gate closing produces a pulse signal via an output circuit connection 88 which goes back through a capacitor 89 to the top most illustrated diode 41 and via the circuit connection 30 to the comparator 29 for producing an output signal that is passed on to the ignition system as indicated above. This takes place even thought the gate 45 is closing, because there is sufficient time delay in the elements of network 39 as determined by a resistor 92 and a capacitor 93 that are related to the network 39.

It may be noted that the spark control network which is illustrated and which is indicated generally by a reference numeral 96 is a known type of circuit arrangement. It provides inverse duration timing of the output control which is applied to the control rectifier 11 so that the higher the speed, i.e. the more frequently the ignition pulse signals appear, the shorter is the time duration of the continuous AC spark output signal. And, by using proper circuit constants, a constant crank angle degree relationship of the spark signal is obtained.

Operation

The operation of the system may be described beginning with a cranking mode, i.e. when the engine is being started. The ignition switch 15 is activated so as to move both arms down to the lower most contacts. The switch arms are of course, spring biased back to the middle contacts but are held in the lower position as the operator turns and holds the starter switch on. Of course, during the cranking mode, the starter solenoid 16 is energized and the starter motor (not shown) will crank the engine. This causes the pistons to be moved in sequence in the cylinders in a conventional manner, while of course the fuel injection pump is actuated in a timed manner so as to produce a high pressure fuel injection in each cylinder at the proper time. Also, during the cranking mode the Wiegand sensor element 46 will develop the gate control pulses in the coil 47 so that at the proper crank shaft position the gate, i.e. bi-stable circuit 45, will be switched so as to open the gate in the electronic control circuit at the earliest desired point. This conditions the control circuit in the connection with comparitor 29 so that it can receive and pass on an ignition control signal if the corresponding injector valve 26 opens and produces an electric pulse through the corresponding capacitor 42 and diode 41 to the input connection 30 of the comparator 29.

However, during a cranking mode the fuel pressure developed may not be sufficient to open the injector valve and consequently, no ignition signal would be created while the gate was open. But, while the cranking mode takes place, the battery voltage is being applied over the connection 20 and via the diode 21 to the input of the comparator 68 which is switched to a nonconducting state (output high). Therefore, even when no valve opening takes place during the gate open interval, the closing of the gate acts (as indicated above) to switch the other comparator 67 of the OR network so that a pulse is created. And, when the output goes high it is passed on over the circuit connection 88 via the capacitor 89 and the diode 41 to the comparator 29 for producing a spark signal output pulse as the gate closes. As soon as the ignition switch 15 returns to the run position the comparator 68 goes conducting and no signal will be created at the output of the OR circuit arrangement (comparators 67 and 68) regardless of the gate closing signal.

During run conditions of the system, i.e. when ignition switch 15 is back at the middle contacts position of both arms, the system action may be described with reference to a single injector valve. Thus, at a predetermined crank shaft position, the Wiegand sensor element will produce a first pulse in the winding 47 (as indicated by the pulse symbol 54). This will open the gate by switching the bi-stable circuit 45 from high voltage output at a point 100 (as is indicated by a pulse symbol 101) down to a low voltage during the gate open condition. While the gate remains open (point 100 at a low voltage), if the injector valve 26 opens, its fuel injection signal will be carried through the corresponding capacitor 42 and diode 41 to the input circuit 30 of the comparator 29. This will cause an ignition control signal to go over the connection 32 and via capacitor 35 into the ignition spark control network 96 to produce the high voltage AC spark signal as controlled by the rectifier 11. Any additional spurious signals which might be created at the injector valve seat following the first one, will be avoided and will not produce any undesirable control signals because of the feedback signal from the ignition network 96. That feedback goes via a circuit connection 57 to the transistor 58 and through the resistor 63 and connection 59 to the resistor 64 and through the connection 60 where it will switch the bi-stable network 45 back so as to close the gate even though the gate closing pulse from the sensor 46 has not yet been received.

It may be noted that this system provides a very reliable control arrangement for producing spark signals of the desired type that avoid problems which have been heretofore encountered, in connection with developing ignition signals from the opening of fuel injection valves.

While a particular embodiment of the invention has been described above in considerable detail in accordance with the applicable statutes, this is not to be taken as in any way limiting the invention but merely as being descriptive thereof.

I claim:

1. In combination with an internal combustion engine having a crank shaft and employing fuel injection and including an AC type high tension electric spark to ignite a combustible mixture of said injected fuel,
   a fuel injection valve having an electrically conductive material plunger in seating contact with an electrically conductive material body of said valve when closed,
   said plunger being actuated by fuel pressure to open said valve,
   first electrical circuit means for connecting a resistor in series with said plunger,
   a comparator having two inputs and an output,
   second circuit means for connecting a predetermined EMF to one of said comparator inputs,
   third circuit means for connecting the other of said comparator inputs to said plunger,
   said comparator output providing a signal to initiate said electric spark when said plunger is actuated by the fuel pressure, the improvement comprising
   means for gating said comparator to permit said electric spark initiating signal only during a predetermined number of degrees of said crank shaft rotation.

2. The invention according to claim 1, wherein
   said last named gating means comprises bi-stable circuit means, and
   means for switching said bi-stable means from one state to the other at the beginning and back at the end of said predetermined degrees of crank shaft rotation.

3. The invention according to claim 2, wherein
   said means for switching said bi-stable means comprises a Wiegand effect sensor.

4. The invention according to claim 3, wherein
   said means for switching said bi-stable means also comprises means for actuating said Wiegand sensor at predetermined crank shaft positions.

5. The invention according to claim 4, wherein
   said improvement also comprises fourth circuit means for connecting said comparator output signal back to said gating means for switching said bi-stable means back whenever a spark initiating signal occurs.

6. The invention according to claim 5, wherein
   said improvement also comprises fifth circuit means for developing a comparator output signal upon switching said bi-stable means back at the end of said predetermined degrees of crank shaft rotation during cranking if said plunger has not been actuated to open said valve.

7. The invention according to claim 6, wherein
   said fifth circuit means comprises an OR circuit.

8. In combination with an internal combustion engine having a crank shaft and fuel injection and including an AC type high tension electric spark to ignite a combustible mixture of said injected fuel,
   a fuel injection valve having an electrically conductive material plunger in seating contact with an electrically conductive material body of said valve when closed,
   said plunger being actuated by fuel pressure to open said valve,
   first electric circuit means for connecting a resistor in series with said plunger,
   a comparator having two inputs and an output,
   second circuit means for connecting a predetermined EMF to one of said comparator inputs,
   third circuit means for connecting the other of said comparator inputs to said plunger,
   said comparator output providing a signal to initiate said electric spark when said plunger is actuated by the fuel pressure,
   the improvement comprising means for gating said comparator to permit said electric spark initiating signal only during a predetermined number of degrees of said crank shaft rotation, said gating means comprising
   bi-stable circuit means,
   a Wiegand sensor for switching said bi-stable circuit means,
   means for actuating said Wiegand sensor at predetermined crank shaft positions to switch said bi-stable circuit means from one state to the other at the beginning and back at the end of said predetermined degrees of crank shaft rotation,
   fourth circuit means for connecting said comparator output signal back to said gating means for switching said bi-stable means back whenever a spark initiating signal occurs, and
   fifth circuit means including an OR circuit for developing a comparator output signal upon switching said bi-stable means back at the end of said predetermined degrees of crank shaft rotation during cranking if said plunger has not been actuated to open said valve.

* * * * *